(No Model.)
G. W. SHAMP.
CLUTCH.
No. 363,006. Patented May 17, 1887.
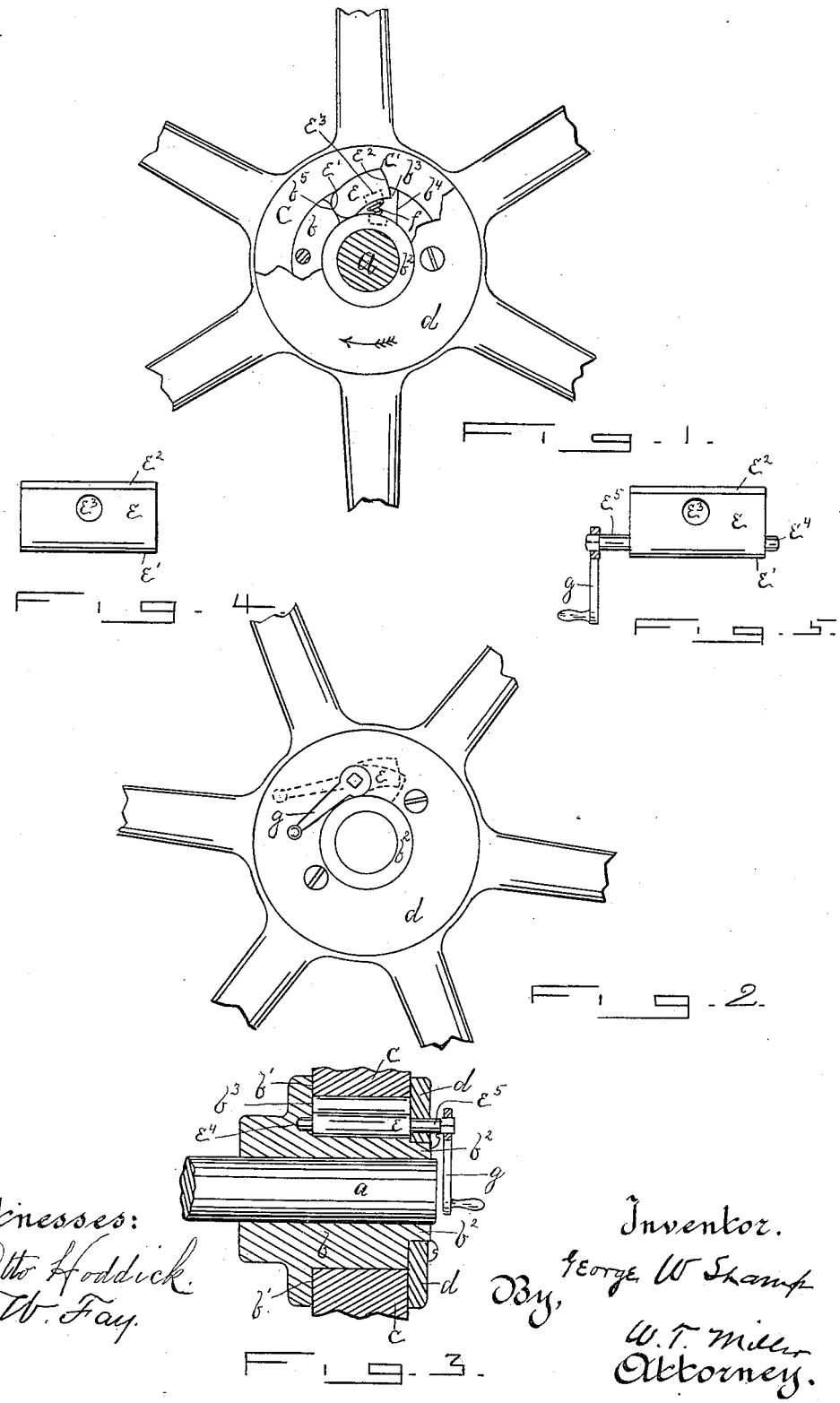

UNITED STATES PATENT OFFICE.

GEORGE W. SHAMP, OF BUFFALO, NEW YORK, ASSIGNOR TO THE ACME MANUFACTURING COMPANY, OF SAME PLACE.

CLUTCH.

SPECIFICATION forming part of Letters Patent No. 363,006, dated May 17, 1887.

Application filed April 3, 1886. Serial No. 197,637. (No model.)

*To all whom it may concern:*

Be it known that I, GEORGE W. SHAMP, a citizen of the United States, residing at Buffalo, in the county of Erie and State of New York, have invented certain new and useful Improvements in Clutch Mechanisms for Shafts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in a certain improved clutch mechanism applied to shafts and their operating wheels or pulleys, it being substantially the same construction as that which was shown and described in my application for a paper-folder filed October 9, 1885, Serial No. 179,376, and for which I therein reserved the right to it as subject-matter of this application.

It consists of a certain combination of parts, which I will now proceed to definitely describe and claim.

In the drawings, Figure 1 is an end elevation of my improved device with portions broken away. Fig. 2 is a modification. Fig. 3 is a vertical longitudinal section of Fig. 2, and Figs. 4 and 5 are detached detail views.

Referring to the drawings, $a$ is the shaft or axle to be revolved; and $b$ is a collar, rigidly keyed or otherwise secured thereon.

$c$ is the hub of the sprocket-wheel or pulley, which loosely encircles the collar $b$, resting against its rear annular shoulder, $b'$. The annular plate or washer $d$ fits over the outer shouldered end, $b^2$, of the collar, and, being secured thereon by screws, holds the wheel or pulley from dislodgment.

$b^3$ is a recess in the collar, extending parallel to the axis of the shaft and to the shoulder $b'$ of the collar. Its wall $b^4$ (see Fig. 1) is inclined to a radial plane drawn from the axis of the shaft. Upon the inner face of the hub $c$ is the angular recess $c'$, extending in a direction parallel to the shaft or axle.

$e$ (see Figs. 1 and 4) is a dog of the same length as the recesses $b^3$ and $c'$. Its rear end, $e'$, is rounded and rests against the rounded wall $b^5$ of the recess $b^3$. Its front end, $e^2$, is of a shape corresponding to the shape of the recess $c'$ in the hub $c$.

$e^3$ is a circular recess or seat for the reception of one end of the spiral spring $f$, the other end of which rests against the collar $b$. This spring $f$ exerts at all times an outward pressure against the dog $e$. The plate or washer $d$ holds the dog against dislodgment.

The operation of my improved mechanism just described is as follows: The driving wheel or pulley in Fig. 1 is in positive rotation, as indicated by the arrow, and the spiral spring $f$ is pressing the dog $e$ up into the recess $c'$ of the hub $c$, a small portion of its end $e^2$ extending down into the recess $b^3$ in the collar $b$. As the wheel revolves, the dog $e$ is pressed down into the recess $b^3$ both by the inner surface of the hub coming in contact with the outer surface of the dog, as well as the inclined wall $b^4$ of the recess $b^3$ striking against the portion of the end $e^2$ of the dog $e$ which projects down into the recess $b^3$. It will thus be seen that in this positive rotation of the hub $c$ the dog $e$ passes in and out of the recess $c'$ in the hub at every revolution, and consequently the shaft $a$ and its collar $b$ remain stationary. When the hub $c$ is revolved in the opposite direction, or in negative rotation, the dog $e$ is held by the spring $f$ permanently in the recess $c'$ of the hub $c$, and its rear end, $e'$, pressing against the wall $b^4$ of the recess $b^3$ in the collar $b$, moves such collar, and with it the shaft $a$. When it is desired to move the shaft $a$ only one revolution, or a portion thereof, with my improved mechanism, it is effected by means of the modification shown in Figs. 2, 3, and 5, in which the hub and collar are the same as in Figs. 1 and 4; but the dog $e$ is provided with the trunnions $e^4$ and $e^5$ for pivoting the dog in the recess $b^3$. The trunnion $e^4$ is seated in the collar $b$, and the trunnion $e^5$ is seated in and passes through the washer $d$, and has at its outer end the lever or handle $g$, which may be moved automatically, as desired, by any suitable mechanism, to throw the dog $e$ in or out of engagement with the collar $b$ upon the shaft $a$; or it may be moved by hand or foot treadle at will to produce the required movement of the shaft.

It is apparent that the axle itself might be recessed, instead of having a recessed collar; but for stability I prefer the form shown.

I claim—

1. The combination, with a shaft provided with a recessed collar rigidly secured thereon, and a wheel or pulley provided with a recessed hub, of a dog adapted to be automatically thrown into and out of engagement with the recessed hub, substantially as shown and described.

2. The combination, with a shaft provided with a recessed collar rigidly secured thereon, and a wheel or pulley provided with a recessed hub, of a dog adapted to be thrown into and out of engagement at will, substantially as shown and described.

3. The combination, with the shaft $a$, provided with the rigid collar $b$, having the recess $b^3$, with inclined wall $b^4$, and the wheel or pulley provided with the hub $c$, having recess $c'$, of the dog $e$ and spiral spring $f$, substantially as shown and described.

In testimony whereof I have signed my name to this specification in the presence of two subscribing witnesses.

GEORGE W. SHAMP.

Witnesses:
HENRY W. HILL,
W. T. MILLER.